US008887258B2

(12) United States Patent
Berionne et al.

(10) Patent No.: US 8,887,258 B2
(45) Date of Patent: Nov. 11, 2014

(54) APPARATUS AND METHOD OF BINDING A REMOVABLE MODULE TO AN ACCESS TERMINAL

(75) Inventors: Michele Berionne, San Diego, CA (US); Brian M. Rosenberg, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 13/487,740

(22) Filed: Jun. 4, 2012

(65) Prior Publication Data

US 2013/0145451 A1 Jun. 6, 2013

Related U.S. Application Data

(60) Provisional application No. 61/521,642, filed on Aug. 9, 2011.

(51) Int. Cl.
| | | |
|---|---|---|
| G06F 7/06 | (2006.01) | |
| G06F 15/16 | (2006.01) | |
| G06F 17/30 | (2006.01) | |
| H04L 29/06 | (2006.01) | |
| H04L 9/32 | (2006.01) | |
| H04K 1/00 | (2006.01) | |
| G06F 21/00 | (2013.01) | |
| G06F 21/34 | (2013.01) | |
| H04W 12/02 | (2009.01) | |
| H04W 12/06 | (2009.01) | |
| H04W 12/04 | (2009.01) | |

(52) U.S. Cl.
CPC ............. *G06F 21/34* (2013.01); *H04W 12/02* (2013.01); *H04L 63/06* (2013.01); *H04L 63/0853* (2013.01); *H04W 12/04* (2013.01); *H04W 12/06* (2013.01)
USPC ................ 726/9; 713/171; 713/185; 380/270

(58) Field of Classification Search
CPC . H04L 63/0428; H04L 63/0853; H04L 63/06; H04W 12/02; H04W 12/06; H04W 12/04; G06F 21/34
USPC ............................................................ 726/9
See application file for complete search history.

(56) References Cited

U.S. PATENT DOCUMENTS 6,711,262 B1 * 3/2004 Vatanen ........................ 380/277
6,898,708 B2 * 5/2005 Hori et al. ..................... 713/171

(Continued)

FOREIGN PATENT DOCUMENTS

| CN | 101945386 A | 1/2011 |
| EP | 1976314 A2 | 10/2008 |

OTHER PUBLICATIONS

International Search Report and Written Opinion—PCT/US2012/050158—ISA/EPO—Oct. 17, 2012.

*Primary Examiner* — Carolyn B Kosowski
(74) *Attorney, Agent, or Firm* — Won Tae Kim

(57) ABSTRACT

The described apparatus and methods may include a processor, a memory in communication with the processor, a removable module in communication with the processor and operable to store data, an initialization component executable by the processor and configured to initialize the removable module, and an authentication component executable by the processor and configured to: receive a command from the removable module to perform an authentication operation, wherein the command is a standard message having a command qualifier value or code that represents an authentication challenge; obtain a random value from the removable module in response to the command; calculate a response based on the random value and a terminal key stored in the memory; and transmit the response to the removable module.

26 Claims, 7 Drawing Sheets

(56) References Cited

U.S. PATENT DOCUMENTS

| | | |
|---|---|---|
| 6,915,272 B1 | 7/2005 | Zilliacus et al. |
| 6,934,531 B1* | 8/2005 | Hake et al. .................... 455/410 |
| 7,325,134 B2* | 1/2008 | Fascenda ...................... 713/169 |
| 7,607,015 B2* | 10/2009 | Fascenda ...................... 713/171 |
| 7,711,960 B2 | 5/2010 | Scarlata |
| 7,844,834 B2* | 11/2010 | Leone et al. ................. 713/193 |
| 8,156,336 B2* | 4/2012 | Brown et al. ................ 713/168 |
| 8,171,531 B2* | 5/2012 | Buer ................................ 726/6 |
| 8,223,971 B2* | 7/2012 | Ahn .............................. 380/277 |
| 8,234,501 B2* | 7/2012 | Stafford et al. .............. 713/184 |
| 8,503,376 B2* | 8/2013 | Cha et al. ..................... 370/329 |
| 8,589,675 B2* | 11/2013 | Zhong .......................... 713/155 |
| 8,595,506 B2* | 11/2013 | Robshaw et al. ............. 713/182 |
| 2004/0015692 A1* | 1/2004 | Green et al. ................... 713/169 |
| 2004/0153419 A1* | 8/2004 | Wary et al. ....................... 705/71 |
| 2005/0105731 A1 | 5/2005 | Basquin |
| 2005/0266886 A1* | 12/2005 | Chan ............................. 455/558 |
| 2006/0105809 A1 | 5/2006 | Luo |
| 2006/0205388 A1* | 9/2006 | Semple et al. ................ 455/411 |
| 2008/0019521 A1* | 1/2008 | Ahn .............................. 380/247 |
| 2008/0200147 A1* | 8/2008 | Nylander et al. ............. 455/411 |
| 2008/0295159 A1* | 11/2008 | Sentinelli .......................... 726/6 |
| 2011/0076986 A1 | 3/2011 | Glendinning et al. |
| 2011/0093693 A1 | 4/2011 | Ibrahim et al. |
| 2011/0314287 A1 | 12/2011 | Escott et al. |
| 2013/0097284 A1* | 4/2013 | Bai et al. ...................... 709/217 |
| 2014/0006347 A1* | 1/2014 | Qureshi et al. ............... 707/621 |

* cited by examiner

502

| Identifier: '6FXX' | Structure: transparent | Optional |
|---|---|---|
| File size: X bytes | Update activity: low ||
| Access Conditions:<br>    READ             PIN<br>    UPDATE       ADM<br>    DEACTIVATE  PIN<br>    ACTIVATE    ADM |||

| Bytes | Description | M/O | Length |
|---|---|---|---|
| 1-X | Secret key | M | X bytes |

504

| Identifier: '6FYY' | Structure: transparent | Optional |
|---|---|---|
| File size: Y bytes | Update activity: low ||
| Access Conditions:<br>    READ             PIN<br>    UPDATE       ADM<br>    DEACTIVATE  ADM<br>    ACTIVATE    ADM |||

| Bytes | Description | M/O | Length |
|---|---|---|---|
| 1-Y | Random value | M | Y bytes |

FIG. 5

APPARATUS AND METHOD OF BINDING A REMOVABLE MODULE TO AN ACCESS TERMINAL

CLAIM OF PRIORITY UNDER 35 U.S.C. §119

This application claims the benefit of U.S. Provisional Patent application Ser. No. 61/521,642 entitled "APPARATUS AND METHOD OF BINDING A REMOVABLE MODULE TO AN ACCESS TERMINAL" which was filed Aug. 9, 2011. The entirety of the aforementioned application is herein incorporated by reference.

BACKGROUND

1. Field

The following relates generally to authentication of access terminals, and more specifically to apparatus and methods of binding a removable module to an access terminal

2. Background

Wireless network operators are increasingly concerned about preventing usage of Universal Integrated Circuit Cards (UICC) or Subscriber Identification Modules (SIM) on unauthorized devices. Techniques to prevent such unauthorized use have grown in importance. Some of these techniques include a secure channel technique, an International Mobile Equipment Identity Software Version (IMEISV) lock, and a Personal Identification Number (PIN) code technique. Unfortunately, the techniques that address this problem have proven either too complex or too easily subverted.

Consequently, there exists a need for a simple and secure mechanism of binding removable modules to access terminals.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of binding a removable module to an access terminal includes initializing the removable module at the access terminal, and receiving a command from the removable module to perform an authentication operation, wherein the command is a standard message having a command qualifier that represents an authentication challenge. Further, the method includes obtaining a random value from the removable module in response to the command, calculating a response based on the random value and a terminal key stored in a memory of the access terminal, and transmitting the response to the removable module.

Additional aspects include: an access terminal having components configured to perform the actions of the above-noted method; at least one processor having modules for performing the actions of the above-noted method; a computer program product including a computer readable medium comprising instructions for causing a computer to perform the actions of the above-noted method; and an apparatus comprising means for performing the actions of the above-noted method.

A further aspect includes a method of binding a removable module to an access terminal including generating a random value at the removable module, transmitting a command to the access terminal to perform an authentication operation, wherein the command is a standard message comprising a command qualifier that represents an authentication challenge, and providing the random value to the access terminal for performing the authentication operation. The method further includes receiving a response calculated by the access terminal based on the random value and a terminal key stored in a memory of the access terminal, and determining based on the response whether to authorize the access terminal to communicate with the removable module.

Additional aspects include: a removable module having components configured to perform the actions of the above-noted method; at least one processor having modules for performing the actions of the above-noted method; a computer program product including a computer readable medium comprising instructions for causing a computer to perform the actions of the above-noted method; and an apparatus comprising means for performing the actions of the above-noted method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 5 is a representation of an aspect of information stored in a memory of the removable module;

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present aspects relate to binding a removable module, such as a Universal Integrated Circuit Cards (UICC) or Subscriber Identification Modules (SIM), to an access terminal (e.g., cellular telephone). In an aspect, the binding is achieved by having the removable module send a command that represents an authentication challenge to the access terminal, thus prompting the access terminal to retrieve a generated random value from the removable module, calculate a response using the random value and a terminal key, and transmit the response to the removable module for authentication. If the removable module determines that the response is valid (e.g. the terminal key used to calculate the response is correct in that it corresponds to a secret key on the removable module), then the removable module may authenticate the access terminal and allow it access to a communications network, such as a 3GPP network. Otherwise, if the response is wrong (e.g., the terminal key is incorrect in that it does not correspond to the secret key on the removable module), the removable module may, in an aspect, cease operating and prevent the access terminal from accessing the communications network. For example, in an aspect, the command may be a standard message or an existing protocol command that is re-purposed according to the described aspects, such as but not limited to a Provide Local Information command having a command qualifier that represents an authentication challenge. Thus, the described apparatus and methods provide for a simple and secure way of binding removable modules to access terminals.

Figure 1:
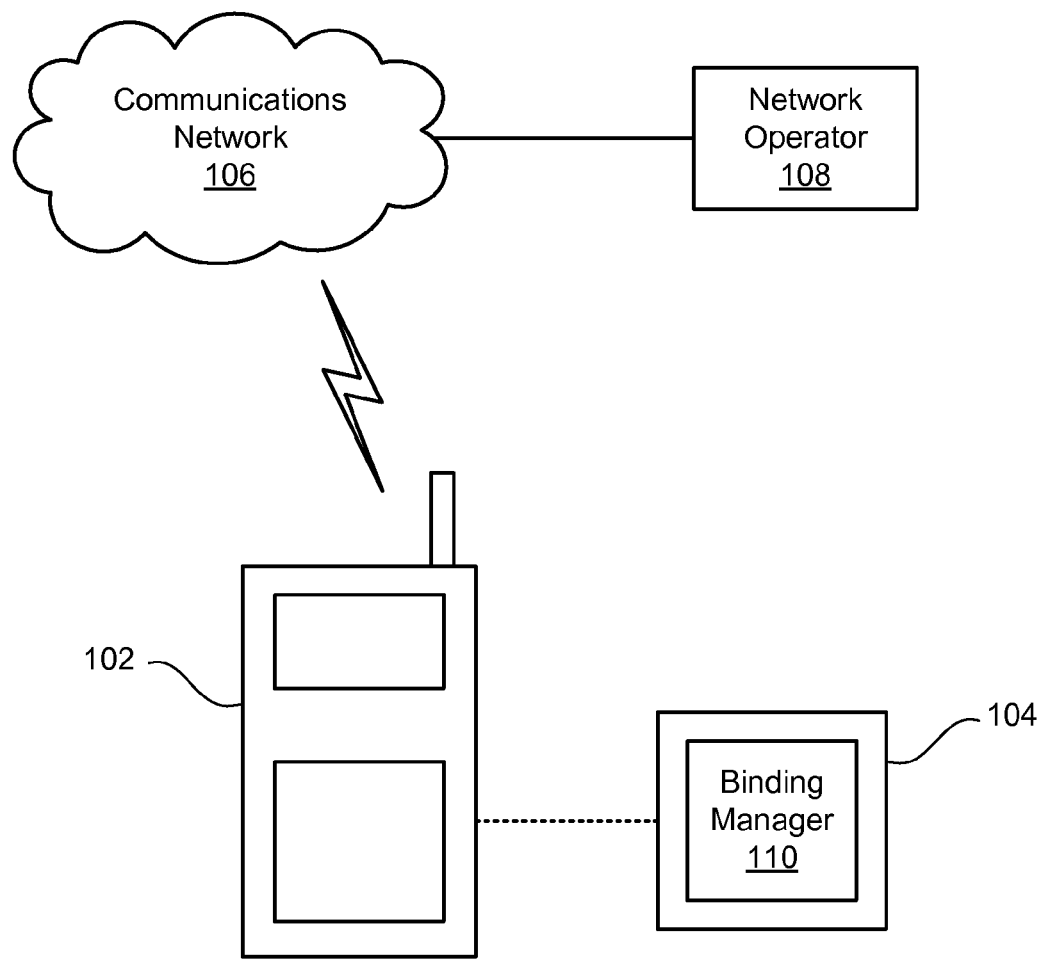
FIG. 1 is a schematic representation of an aspect of a binding system within a network deployment.

FIG. 1, for example, shows a network deployment 100 including a communications network 106, a network operator 108, an access terminal 102, and a removable module 104 mated with or otherwise capable of being mated with the access terminal 102.

The communications network 106 may include a number of base stations (not shown) and other network entities that can support various services, such as radio communication, for access terminals. The network operator 108 may be a single network entity or a collection of network entities and may provide coordination and control for a set of base stations as well as provision the removable module 104 with information.

The access terminal 102 may communicate with base stations in the communications network to obtain communication services. As shown in FIG. 1, the removable module 104 may be inserted or otherwise connected in communication with the access terminal 102. The removable module 104 may store subscription information, personal information, and/or other information for a user. For example, removable module 104 may store account numbers, phone numbers, pictures, text messages, etc. The removable module 104 may be, but is not limited to, a removable identification (ID) chip, a Universal Integrated Circuit Card (UICC), a User Identity Module (UIM), a Removable UIM (R-UIM), a CDMA Subscriber Identity Module (CSIM), a Subscriber Identity Module (SIM), a Universal Subscriber Identity Module (USIM), a smartcard, or some other module that may be inserted into and removed from a device such as a cellular phone, a smart phone, a PDA, etc., for the purpose of enabling communication with a communication network.

According to aspects, the removable module 104 may be configured with a binding manager 110 that allows the removable module 104 to bind with the access terminal 102. The binding manager 110 ensures that the removable module 104 works only with the access terminal 102 that it is bound to and no other access terminal, preventing unauthorized use of the removable module 104 with unauthorized access terminals.

Figure 2:
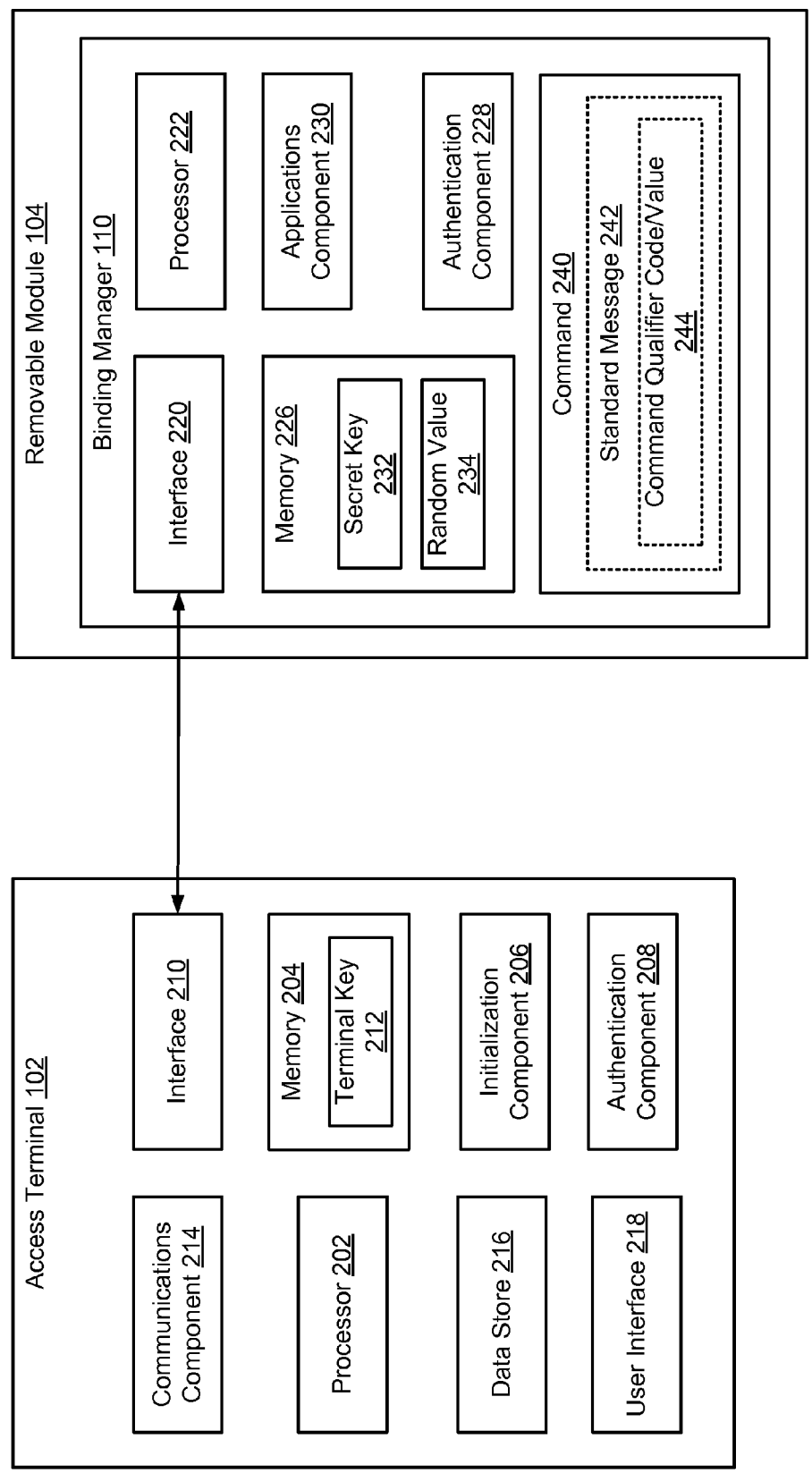
FIG. 2 is a schematic representation of an aspect of an access terminal and a removable module capable of implementing a binding mechanism.

FIG. 2 shows a schematic representation of an aspect of an access terminal 102 and a removable module 104 capable of implementing the binding manager 110. The access terminal 102 may include at least one processor 202 and memory 204.

The processor 202 may carry out processing functions associated with one or more of the components and functions within the access terminal 102. The processor 202 may include a single or multiple set of processors or multi-core processors. Moreover, the processor 202 can be implemented as an integrated processing system and/or a distributed processing system.

The memory 204 may be used for storing data, such as a terminal key 212. For example, terminal key 212 may include an authentication mechanism, such as an encryption and/or decryption algorithm, which may be used to encode and/or decode messages based on an authentication procedure, such encoding responses to authentication challenges. The memory 204 may also store local versions of applications, modules, components, or algorithms being executed by processor 202. Memory 204 can include any type of memory usable by a computer, such as random access memory (RAM), read only memory (ROM), tapes, magnetic discs, optical discs, volatile memory, non-volatile memory, and any combination thereof. For example, memory 204 may include instructions for performing all or some portion of the actions of the access terminal 102.

Further, the access terminal 102 may include a communications component 214 that provides for establishing and maintaining communications with one or more entities, for example utilizing hardware, software, and services as described herein. Communications component 214 may carry communications between components on the access terminal 102, as well as between the access terminal 102 and external devices, such as devices located across a communications network and/or devices serially or locally connected to the access terminal 102, such as removable module 104. For example, communications component 106 may include one or more buses, and may further include one or more transmit chain components and receive chain components and a respectively associated transmitter and receiver, or one or more transceivers, operable for interfacing with external devices.

Additionally, access terminal 102 may further include a data store 216, which can be any suitable combination of hardware and/or software, that provides for mass storage of information, databases, and programs employed in connection with aspects described herein. For example, data store 216 may be a data repository for applications not currently being executed by processor 202.

The access terminal 102 may additionally include a user interface component 218 that is configured to receive inputs from a user of access terminal 102, and further configured to generate outputs for presentation to the user. User interface component 218 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 218 may include one or more output devices, including but not limited to a display, a speaker, a haptic feedback mechanism, a printer, any other mechanism capable of presenting an output to a user, or any combination thereof.

The access terminal 102 may further include an initialization component 206 and an authentication component 208. The initialization component 206 is configured to initialize the removable module 104 when the removable module 104 is inserted into the access terminal 102 and the access terminal 102 is powered on. The authentication component 208 may perform various functions related to the binding manager 110 when in communication with the removable module 104. For example, the authentication component 208 may manage the receipt and interpretation of messages, as well as responses to messages, for example, based on one or more authentication procedures.

The access terminal 102 may also include an interface 210 that is configured to facilitate communication between the access terminal 102 and the removable module 104 when in contact with the interface 220 of the removable module 104.

As shown in FIG. 2, the removable module 104 may include at least one processor 222. The processor 222 may carry out processing functions associated with one or more of the components and functions within the removable module 104. The processor 222 may be any type of processor suited for implementation on the removable module 104.

The removable module 104 may also include memory 226. Memory 226 may include various information, such as personal information, as well as specific elementary files including a secret key 232 and a random value 234. The secret key 232 may be provisioned by the network operator 108, and the random value 234 may be generated by an authentication component 228. The memory 204 may also store local versions of applications, modules, components, or algorithms being executed by processor 222. Memory 226 may also include instructions for performing all or some portion of the actions of the removable module 104. Memory 226 can include any type of memory usable by a computer, as described with reference to memory 204 of the access terminal 102.

The removable module 104 may also include authentication component 228. The authentication component 228 may be executable by the processor 222, and be configured to control the binding of the removable module 104 to the access terminal 102.

The removable module 104 may further include an applications component 230 and an interface 220. The applications component 230 may support various services (e.g., voice, packet data, Short Message Service (SMS), browser), and the interface 220 may support secure communication with the access terminal 102 when coupled with the interface 210 of the access terminal 102.

During operation, once the removable module 104 is inserted into the access terminal 102, coupling together interfaces 210 and 220, and the access terminal 102 is powered on, the initialization component 206 may detect and initialize the removable module 104 by powering the removable module 104 via the interfaces 210 and 220.

In one optional aspect, upon initialization of the removable module 104, the authentication component 208 may determine whether a secret key 232 for accessing the functions and services of the removable module 104 is available for acquisition from the removable module 104. The authentication component 208 may perform such a determination by either reading the memory 226 of the removable module 104 or transmitting a key acquisition request to the removable module 104.

If the secret key 232 is available in the memory 226, in response to the key acquisition request or an attempt to read the secret key 232, the authentication component 228 of the removable module 104 may provide the secret key 232 to the access terminal 102. When the access terminal 102 receives the secret key 232 from the removable module 104, it may store the secret key 232 in the memory 204. For purposes of this explanation, any key, including the secret key 232, that is stored in memory 204 of the access terminal 102 may be referred to as the terminal key 212. After the secret key 232 is stored in the memory 204 of the access terminal 102 as the terminal key 212, the authentication component 208 of the access terminal 102 may transmit a signal to the removable module 104 that deactivates the secret key 232 in the memory 226 such that the secret key 232 is rendered inaccessible. For example, deactivation of the secret key 232 may be achieved by invalidating the secret key 232, or otherwise rendering the secret key 232 inaccessible by any component or means outside of the removable module 104 while retaining access to the secret key 232 only by the removable module 104. This deactivation mechanism results in the removable module 104 being bound to the access terminal 102 that has possession of the secret key 232.

If, on the other hand, the secret key 232 is not available in the memory 226, the authentication component 228 may indicate to the access terminal 102 that the secret key 232 is not available. The secret key 232 may become unavailable if it had previously been deactivated by the access terminal 102 or some other access terminal In an aspect, regardless of whether the secret key 232 is provided to the access terminal 102 by the authentication component 228, upon initialization of the removable module 104, such as upon a power up of the access terminal 102, the authentication component 228 of the removable module 104 may generate a random value 234 for use in an authentication operation, and store the random value 234 in the memory 226.

Thereafter, the authentication component 228 of the removable module 104 may transmit to the access terminal 102 a command 240 to perform the authentication operation. In an aspect, for example, the command 240 may be a standard message 242, such as a Provide Local Information command, having a command qualifier value or code 244 that represents an authentication challenge. In addition to the command 240, the authentication component 228 may make available the random value 234 for acquisition by the access terminal 102.

Upon receipt of and in response to the command 240 from the removable module 104, the authentication component 208 of the access terminal 102 may obtain the random value 234 from the memory 226 of the removable module 104. The authentication component 208 may then calculate a response based on the random value 234 and the stored terminal key 212. The response, generated based on terminal key 212, may be calculated using an appropriate algorithm defined by, associated with, or included as a part of terminal key 212, which as noted above may be the secret key 232 provided to the access terminal 102 by the network operator 108 or obtained by the authentication component 208 from the removable module 104.

Once the response is calculated, the authentication component 208 may transmit the response to the removable module 104 for verification. The authentication component 228 of the removable module 104 may receive the response and determine whether the terminal key 212, with which the response was calculated, corresponds to the secret key 232, and thus, determine whether to authorize the access terminal 102 to communicate in the communications network 106 by use of the removable module 104, as well as to have access to functions and services available on the removable module 104. In an aspect, determining whether the terminal key 212 and the secret key 232 correspond may include analyzing the response to see if the response is correct. For example, the response may be such that the authentication component 228 would recognize the response as having been calculated with the correct key (e.g., secret key 232).

If the authentication component 228 of the removable module 104 determines that the terminal key 212 corresponds to the secret key 232 (e.g., the terminal key 212 is the secret key 232 that was obtained from the memory 226 of the removable module 104), then the authentication component 228 may authorize the access terminal 102 access to the communications network 106 and the functions and services of the removable module 104.

If, on the other hand, the authentication component 228 of the removable module 104 determines that the terminal key 212 does not correspond to the secret key 232 (i.e., the terminal key 212 is different from the secret key 232), then the authentication component 228 may lock out the access terminal 102 by preventing the access terminal 102 from having access to the communications network 106 and the functions and services of the removable module 104.

In some aspects, the authentication component 228 may lock out the access terminal 102 after a predetermined amount of time during which the access terminal 102 does not respond to the authentication challenge, or after the access terminal 102 provides an incorrect key a predetermined number of times in response to the authentication challenge.

The aforementioned architecture thus provides for a simple and secure mechanism of binding removable module 104 to access terminal 102.

Figure 3:
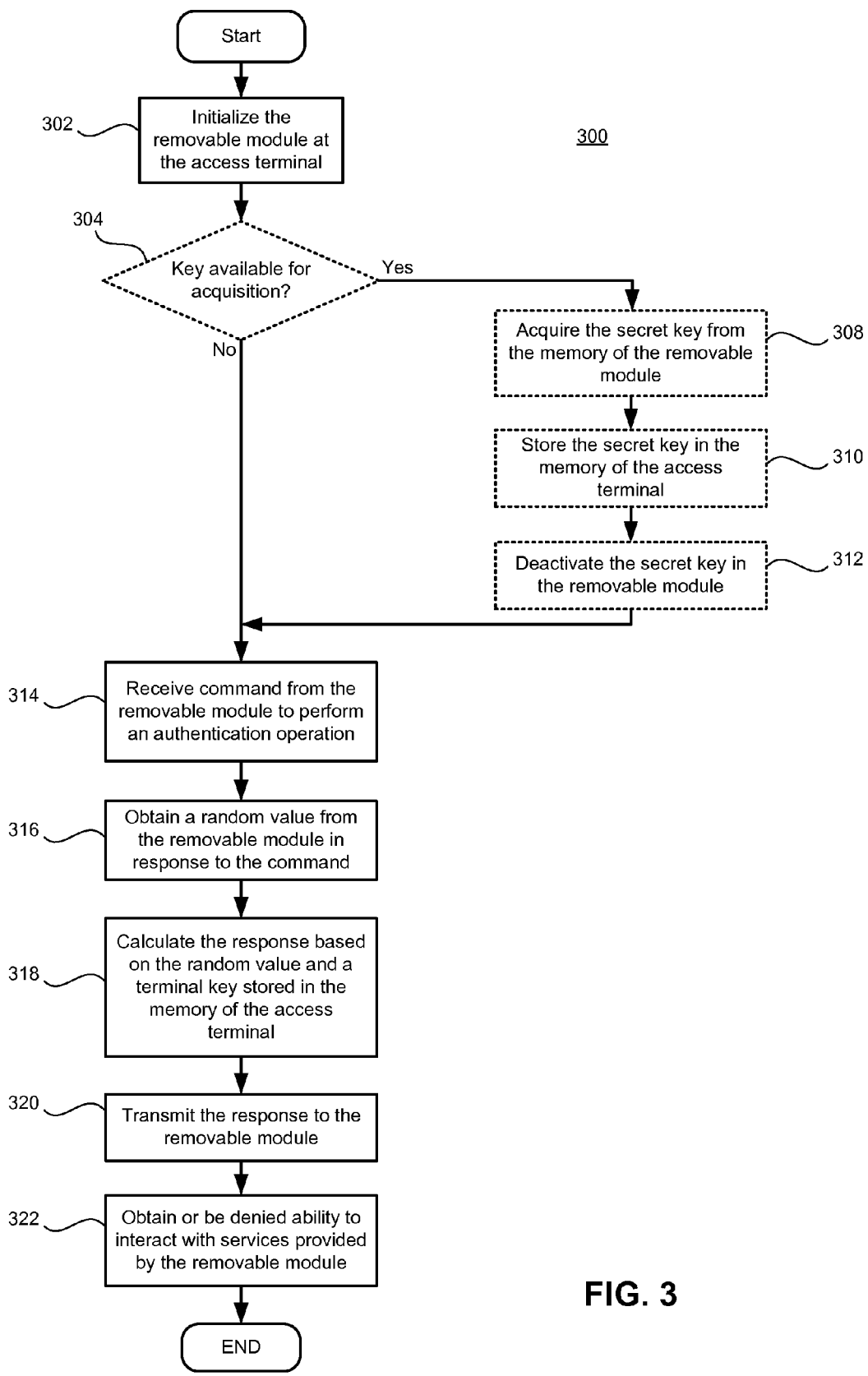
FIG. 3 is a flow chart of an aspect of a method of binding a removable module to an access terminal as implemented on the access terminal of FIG. 1.

FIG. 3 shows an exemplary process 300 of binding a removable module to an access terminal, which may be implemented in the access terminal 102 of FIG. 1

As shown in FIG. 3, in block 302, the process initializes the removable module at the access terminal For example, the initialization component 206 may initialize the removable module 104 at the access terminal 102, such as based on insertion of the removable module 104 into the access terminal 102, or based on a powering up of access terminal 102 having an already-inserted removable module 104.

Optionally, in block 304, the process determines whether a secret key is available for acquisition from the removable module. For example, the authentication component 208 may determine whether secret key 232 is available for acquisition from the removable module 104. If the process determines that the key is available, then the process proceeds to block 308. Otherwise, the process proceeds to block 314.

Optionally, in block 308, the process acquires the secret key from a memory of the removable module. For example, the authentication component 208 may acquire the secret key 232 from the memory 226 of the removable module 104. For instance, memory 226 may include an elementary file that defines secret key 232.

Following the acquisition of the secret key in this optional aspect, the process, in block 310, stores the secret key in the memory of the access terminal For example, the authentication component 208 may store the secret key 232 in the memory 226 of the access terminal 102.

Thereafter, in this optional aspect, the process, in block 312 deactivates the secret key in the removable module such that the secret key is rendered inaccessible to components outside the removable module 104 while remaining accessible to the removable module 104. For example, the authentication component 208 may send a signal to the removable device 104 that deactivates (e.g., invalidates) the secret key 232 in the memory 226 of the removable module 104. The process then proceeds to block 314.

In block 314, the process receives a command from the removable module to perform an authentication operation. In one aspect, for instance, the command may be a standard message, such as a Provide Local Information command, having a command qualifier value or code that represents an authentication challenge. For example, the authentication component 208 may receive the command to perform the authentication operation from the removable module 104.

In block 316, the process obtains a random value from the removable module in response to the command For example, the authentication component 208 may obtain the random value 234 from the removable module 104. For instance, in an aspect, the random value 234 may be stored in an elementary file in memory 226 of removable module 104.

In block 318, the process calculates a response based on the random value and a terminal key stored in the memory of the access terminal For example, the authentication component 208 may calculate a response based on the random value 234 and the terminal key 212 stored in the memory 204 of the access terminal 102. In one aspect, terminal key 212 may be previously loaded onto the access terminal 102, such as via a network operator or a device manufacturer. In another optional aspect, as detailed above, the access terminal 102 may obtain the terminal key 212 via the above-described optional interactions (e.g. blocks 308 and 310) with removable module 104.

In block 320, the process transmits the response to the removable module. For example, the authentication component 208 may transmit the calculated response to the removable module 104.

Optionally, in block 322, the process may conclude with obtaining the ability to interact with services provided by the removable module 104, e.g. if the response was valid such as based on having terminal key 212 that matches secret key 232, or with being denied access to the removable module 104, e.g. if the response was valid such as based on having terminal key 212 that matches secret key 232. As such, the process 300 results in an ability to bind a removable module 104 to an access terminal 102 such that only an authorized access terminal has access to the services provided by removable module 104, such as the ability to communicate with communications network 106 (FIG. 1).

Figure 4:
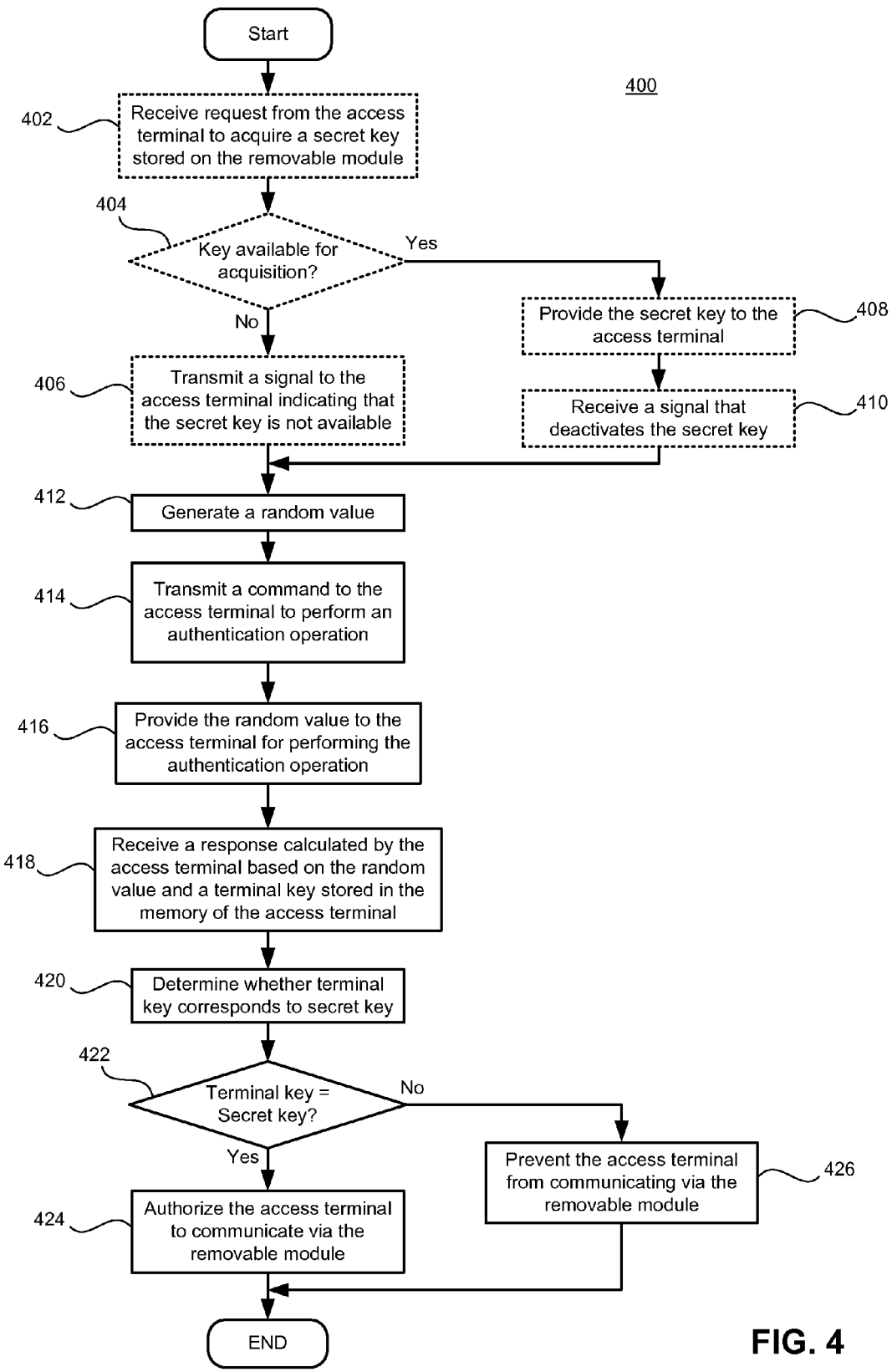
FIG. 4 is a flow chart of an aspect of a method of binding a removable module to an access terminal as implemented on the removable module of FIG. 1.

FIG. 4 shows an exemplary process 400 of binding a removable module to an access terminal, which may be implemented in the removable module 104 of FIG. 1. An optional aspect of the process 400 includes blocks 402-410.

As shown in FIG. 4, in block 402, the process may optionally receive a request from the access terminal to acquire a secret key stored on the removable module. For example, the authentication component 228 on the removable module 104 may receive a request from the access terminal 102 to acquire the secret key 232 stored in the memory 226 of the removable module 104.

Optionally, in block 404, the process determines whether the secret key is available for acquisition. For example, the authentication component 228 may check the memory 226 to determine whether the secret key 232 is available for acquisition by the access terminal 102. If the process determines that the secret key is available, then the process proceeds to block 408. Otherwise, the process proceeds to block 406.

Optionally, in block 408, the process provides the secret key to the access terminal For example, the authentication component 228 may allow the access terminal 102 to read the secret key 232 from the memory 226. For instance, memory 226 may include an elementary file that defines secret key 232. In this optional aspect, after the secret key has been provided to the access terminal, the process in block 410 receives a signal that deactivates the secret key such that the secret key is rendered inaccessible. For example, the removable module 104 may receive a signal from the access terminal 102 that deactivates, deletes, or invalidates the secret key 232 stored in the memory 226 of the removable module 104. The process then proceeds to block 412.

In block 406, the process transmits a message to the access terminal indicating that the secret key is not available. For example, the authentication component 228 may transmit a signal to the access terminal 102 indicating that the secret key 232 is not available. The process then proceeds to block 412.

In block 412, the process generates a random value. For example, random value 234 may be generated by the authentication component 228 at the removable terminal 104. For instance, in an aspect, the random value 234 may be stored in an elementary file in memory 226 of removable module 104.

In block 414, the process transmits a command to the access terminal to perform an authentication operation. For example, the authentication component 228 may transmit the command 240 to the access terminal 102. In one aspect, for instance, the command 240 is a standard message 242, such as a Provide Local Information command, comprising a command qualifier value or code 244 that represents an authentication challenge.

In block 416, the process provides the random value to the access terminal for performing the authentication operation. For example, the authentication component 228 may provide the random value 234 to the access terminal 102.

In block 418, the process receives a response calculated by the access terminal based on the random value and a terminal key stored in a memory of the access terminal For example, the authentication component 228 may receive a response calculated by the access terminal 102 based on the random value 234 and terminal key 212 stored in the memory 204 of the access terminal 102. In one aspect, terminal key 212 may be previously loaded onto the access terminal 102, such as via a network operator or a device manufacturer. In another optional aspect, as detailed above, the removable module 104 may have provided the access terminal 102 with the terminal key 212 (e.g., the secret key 232) via the above-described optional interactions (e.g. blocks 402, 404 and 408) with access terminal 102.

In block 420, the process determines whether the terminal key corresponds to the secret key. For example, the authentication component 228 of the removable module 104 may analyze the received response and based on the response determine whether the terminal key 212 corresponds to the secret key 232. For example, in one aspect, the access terminal 102 may apply the terminal key 212 to the obtained random number, and send the result to the removable module 104 as the response. As such, the removable module 104 may be able to apply the secret key 232 to the response, and the result would be the random number if the terminal key 212 corresponds to the secret key 232. It should be noted, however, that other authentication processes utilizing the terminal key 212 and the secret key 232 may also be utilized.

In block 422, the process determines based on the response whether to authorize the access terminal to communicate with the removable module based on whether the terminal key corresponds to the secret key. For example, the authentication component 228 may determine based on the response whether to authorize the access terminal 102 to communicate with the removable module 104. If the terminal key corresponds to the secret key, the process proceeds to block 424. Otherwise, the process proceeds to block 426.

In block 424, the process authorizes the access terminal to communicate with the removable module. For example, the authentication component 228 may authorize the access terminal 102 to communicate with the communications network 106 by use of the removable module 104 and access functions and services available on the removable module 104.

In block 426, the process prevents the access terminal from communicating with the removable module. For example, the authentication component 228 may prevent the access terminal 102 from communicating with the communications network 106 by use of the removable module 104 and accessing functions and services available on the removable module 104. As such, the process 400 results in an ability to bind a removable module 104 to an access terminal 102 such that only an authorized access terminal has access to the services provided by removable module 104, such as the ability to communicate with communications network 106 (FIG. 1).

FIG. 5 is a representation of an aspect of information stored in memory 226 of the removable module 104. In particular, the memory 226 may include a plurality of elementary files, such as a key file 502 and a rand file 504, both having a plurality of fields for storing file-specific information. For example, the key file 502 may include a field containing the secret key 232; and the rand file 504 may include a field containing the random value 234. The random value 234 may be updated each time the removable module 104 initiates an authentication operation for binding the removable module 104 to the access terminal 102.

Figure 6:
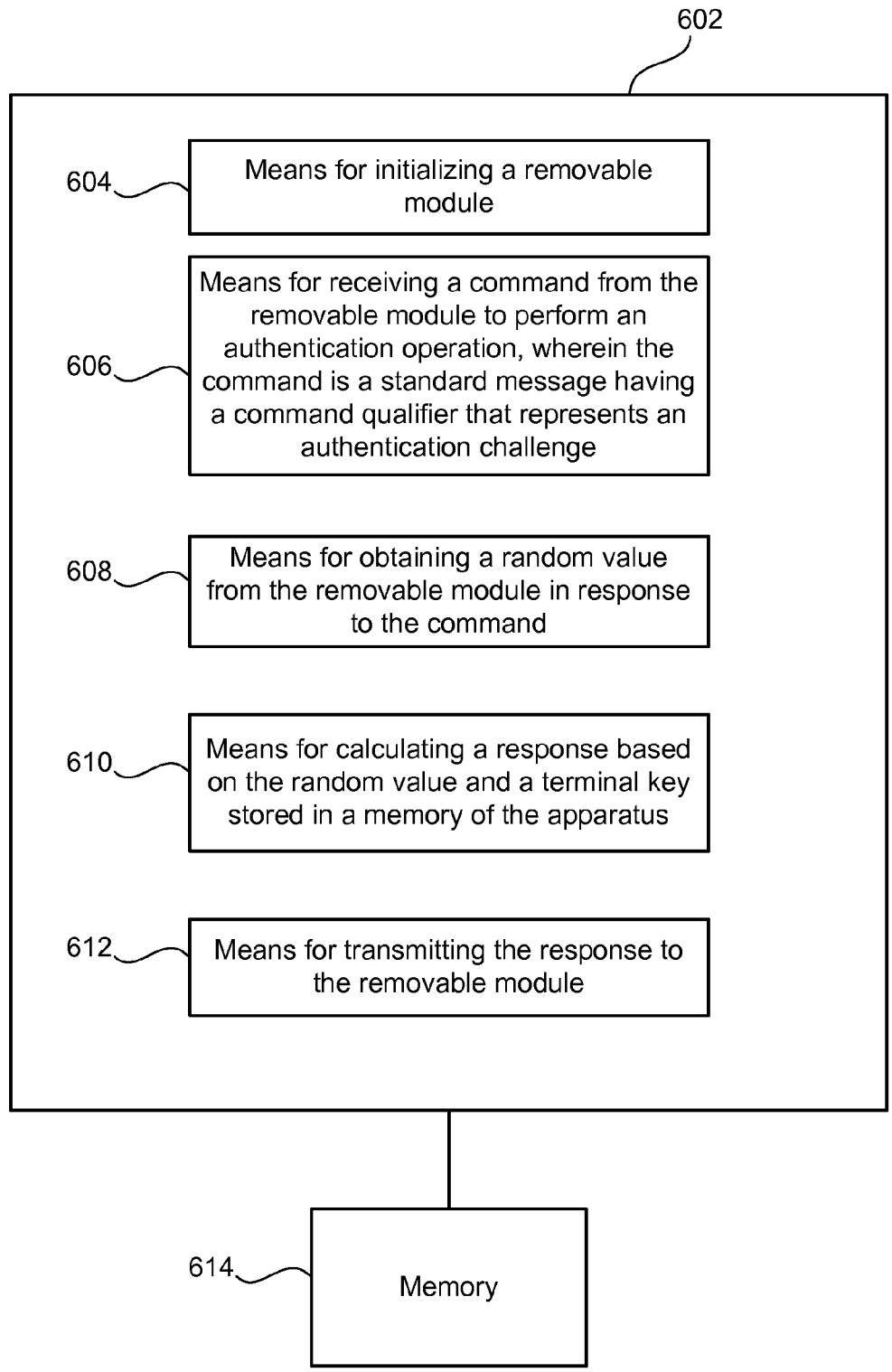
FIG. 6 is an illustration of an example system that binds a removable module to an access terminal as implemented on the access terminal of FIG. 1.

FIG. 6 is an illustration of an example system 600 that is capable of binding a removable module to an access terminal. For example, system 600 can reside at least partially within an access terminal, etc. It is to be appreciated that system 600 is represented as including functional blocks, which can be functional blocks that represent functions implemented by a processor, software, or combination thereof (e.g., firmware). System 600 includes a logical grouping 602 of means that can act in conjunction. For instance, logical grouping 602 can include: means for initializing a removable module 604; means for receiving a command from the removable module to perform an authentication operation, wherein the command is a standard message having a command qualifier that represents an authentication challenge 606; means for obtaining a random value from the removable module in response to the command 608; means for calculating a response based on the random value and a terminal key stored in a memory of the apparatus 610; and means for transmitting the response to the removable module 612. Additionally, system 600 can include a memory 614 that retains instructions for executing functions associated with the means 604 through 612. While shown as being external to memory 614, it is to be understood that one or more of the means 604 through 612 can exist within memory 612.

Figure 7:
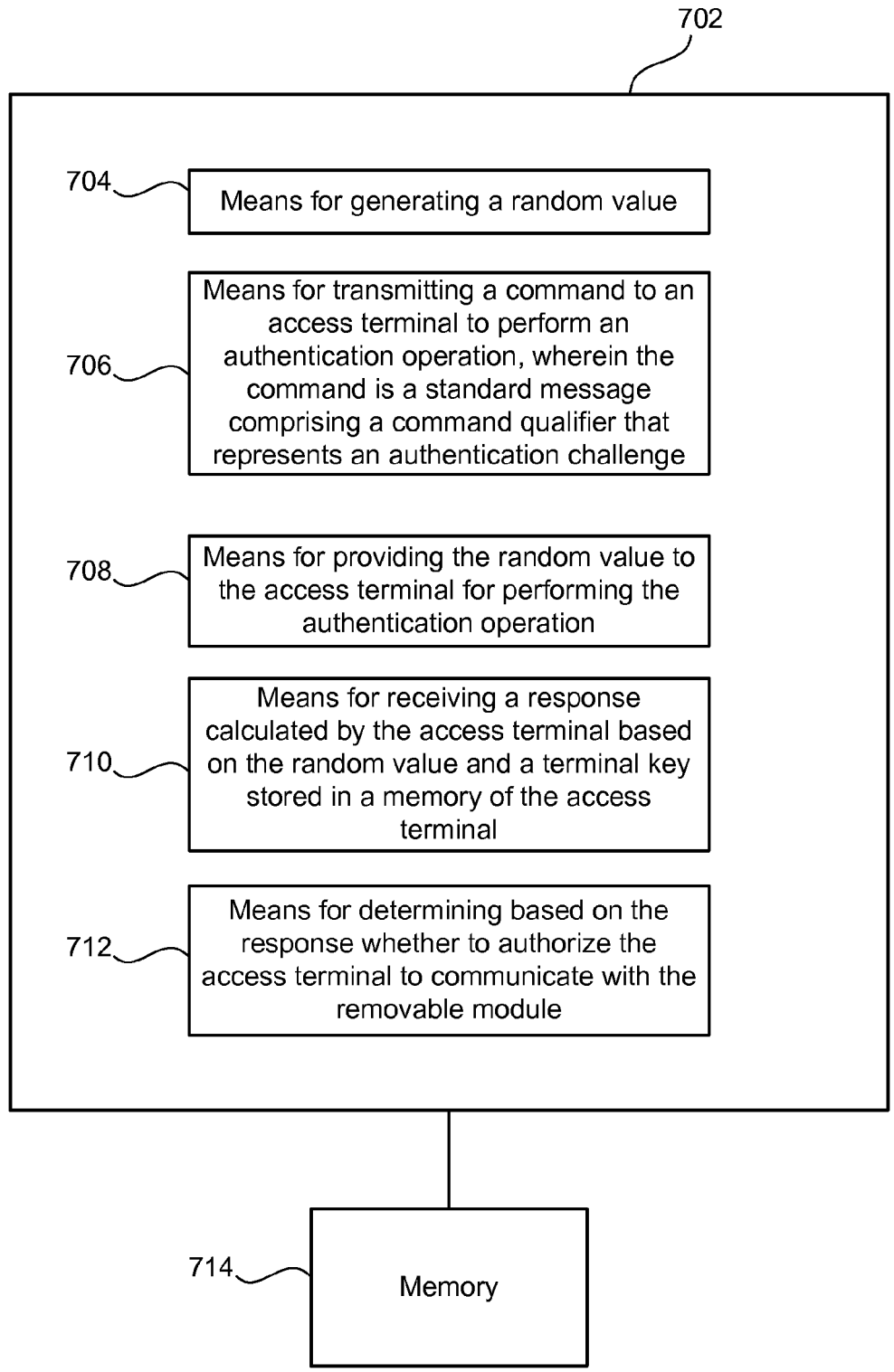
FIG. 7 is an illustration of an example system that binds a removable module to an access terminal as implemented on the removable module of FIG. 1.

FIG. 7 is an illustration of an example system 700 that is capable of binding a removable module to an access terminal. For example, system 700 can reside at least partially within a removable module, etc. It is to be appreciated that system 700 is represented as including functional blocks, which can be functional blocks that represent functions implemented by a processor, software, or combination thereof (e.g., firmware). System 700 includes a logical grouping 702 of means that can act in conjunction. For instance, logical grouping 702 can include: means for generating a random value 704; means for transmitting a command to an access terminal to perform an authentication operation, wherein the command is a standard message comprising a command qualifier that represents an authentication challenge 706; means for providing the random value to the access terminal for performing the authentication operation 708; means for receiving a response calculated by the access terminal based on the random value and a terminal key stored in a memory of the access terminal 710; and means for determining based on the response whether to authorize the access terminal to communicate with the removable module 712. Additionally, system 700 can include a memory 714 that retains instructions for executing functions associated with the means 704 through 712. While shown as being external to memory 714, it is to be understood that one or more of the means 704 through 712 can exist within memory 712.

Thus, based on the foregoing, the described apparatus and methods enable binding a removable module to an access terminal in a simple and secure manner.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of binding a removable module to an access terminal, comprising:
   initializing the removable module at the access terminal;
   prior to receiving a command from the removable module, determining that a secret key is available for acquisition from the removable module;
   acquiring the secret key from the removable module responsive to the secret key being available from the removable module;
   storing the secret key in a memory of the access terminal as a terminal key;
   deactivating the secret key in the removable module such that the secret key is rendered inaccessible;
   receiving the command from the removable module to perform an authentication operation, wherein the command is a standard message having a command qualifier that represents an authentication challenge;
   obtaining a random value from the removable module in response to the command;
   calculating a response based on the random value and the terminal key stored in the memory of the access terminal; and
   transmitting the response to the removable module.

2. The method of claim 1, wherein the command is a Provide Local Information command.

3. An access terminal, comprising:
   a processor;
   a memory in communication with the processor;
   a removable module in communication with the processor and operable to store data;
   an initialization component executable by the processor and configured to initialize the removable module;
   an authentication component executable by the processor and configured to:
      receive a command from the removable module to perform an authentication operation, wherein the command is a standard message having a command qualifier that represents an authentication challenge;
      obtain a random value from the removable module in response to the command;
      calculate a response based on the random value and a terminal key stored in the memory;
      transmit the response to the removable module;
      determine, prior to receiving the command from the removable module, whether a secret key is available for acquisition from the removable module;
      acquire the secret key from the removable module;
      store the secret key in the memory of the access terminal as the terminal key; and
      deactivate the secret key in the removable module such that the secret key is rendered inaccessible.

4. The access terminal of claim 3, wherein the command is a Provide Local Information command.

5. The access terminal of claim 3, wherein, if the secret key is not available from the removable module, the authentication component is further configured to acquire the terminal key from the memory of the access terminal.

6. At least one processor for binding a removable module to an access terminal, comprising:
   a first module for initializing the removable module at the access terminal;
   a second module for receiving a command from the removable module to perform an authentication operation, wherein the command is a standard message having a command qualifier that represents an authentication challenge;
   a third module for obtaining a random value from the removable module in response to the command;
   a fourth module for calculating a response based on the random value and a terminal key stored in a memory of the access terminal;
   a fifth module for transmitting the response to the removable module;
   a sixth module for determining, prior to receiving the command from the removable module, whether a secret key is available for acquisition from the removable module;
   a seventh module for acquiring the secret key from the removable module;
   a eighth module for storing the secret key in the memory of the access terminal as the terminal key; and
   a ninth module for deactivating the secret key in the removable module such that the secret key is rendered inaccessible.

7. The at least one processor of claim 6, wherein the command is a Provide Local Information command.

8. A non-transitory computer-readable medium, having stored thereon computer-readable instructions for binding a removable module to an access terminal, comprising:
   at least one instruction executable to cause a computer to initialize the removable module at the access terminal;
   at least one instruction executable to cause the computer to receive a command from the removable module to perform an authentication operation, wherein the command is a standard message having a command qualifier that represents an authentication challenge;

at least one instruction executable to cause the computer to obtain a random value from the removable module in response to the command;

at least one instruction executable to cause the computer to calculate a response based on the random value and a terminal key stored in a memory of the access terminal;

at least one instruction executable to cause the computer to transmit the response to the removable module;

at least one instruction executable to cause the computer to determine, prior to receiving the command from the removable module, whether a secret key is available for acquisition from the removable module;

at least one instruction executable to cause the computer to acquire the secret key from the removable module;

at least one instruction executable to cause the computer to store the secret key in the memory of the access terminal as the terminal key; and at least one instruction executable to cause the computer to deactivate the secret key in the removable module such that the secret key is rendered inaccessible.

9. The computer program product of claim 8, wherein the command is a Provide Local Information command.

10. An apparatus, comprising:
means for initializing a removable module;
means for receiving a command from the removable module to perform an authentication operation, wherein the command is a standard message having a command qualifier that represents an authentication challenge;
means for obtaining a random value from the removable module in response to the command;
means for calculating a response based on the random value and a terminal key stored in a memory of the apparatus;
means for transmitting the response to the removable module;
means for determining, prior to receiving the command from the removable module, whether a secret key is available for acquisition from the removable module,
means for acquiring the secret key from the removable module responsive to the secret key being available from the removable module, and
means for storing the secret key in the memory of the access terminal as the terminal key.

11. The apparatus of claim 10, wherein the command is a Provide Local Information command.

12. The apparatus of claim 10, further comprising means for determining whether a secret key is available for acquisition from the removable module prior to receiving the command from the removable module.

13. A method of binding a removable module to an access terminal, comprising:
generating a random value at the removable module;
transmitting a command to the access terminal to perform an authentication operation, wherein the command is a standard message comprising a command qualifier that represents an authentication challenge;
providing the random value to the access terminal for performing the authentication operation;
receiving a response calculated by the access terminal based on the random value and a terminal key stored in a memory of the access terminal;
determining based on the response whether to authorize the access terminal to communicate with the removable module;
prior to generating the random value, receiving a request from the access terminal to acquire a secret key stored on the removable module;
providing the secret key to the access terminal; and
receiving a signal that deactivates the secret key such that the secret key is rendered inaccessible.

14. The method of claim 13, wherein the command is a Provide Local Information command.

15. The method of claim 13, wherein determining whether to authorize the access terminal comprises determining whether the terminal key corresponds to the secret key.

16. The method of claim 15, further comprising:
if the terminal key corresponds to the secret key, authorizing the access terminal to communicate with the removable module; and
if the terminal key does not correspond to the secret key, preventing the access terminal from communicating with the removable module.

17. A removable module, comprising:
a processor;
a memory in communication with the processor;
an authentication component executable by the processor and configured to:
generate a random value;
transmit a command to an access terminal to perform an authentication operation, wherein the command is a standard message comprising a command qualifier that represents an authentication challenge;
provide the random value to the access terminal for performing the authentication operation;
receive a response calculated by the access terminal based on the random value and a terminal key stored in a memory of the access terminal;
determine based on the response whether to authorize the access terminal to communicate with a communications network with the removable module;
receive a request from the access terminal to acquire a secret key stored on the removable module;
provide the secret key to the access terminal; and
receive a signal that deactivates the secret key such that the secret key is rendered inaccessible.

18. The removable module of claim 17, wherein the command is a Provide Local Information command.

19. The removable module of claim 17, wherein the authentication component when determining whether to authorize the access terminal is further configured to determine whether the terminal key corresponds to the secret key.

20. The removable module of claim 19, wherein the authentication component is further configured to:
authorize the access terminal to communicate with the removable module if the terminal key corresponds to the secret key; and
prevent the access terminal from communicating with the removable module if the terminal key does not correspond to the secret key.

21. At least one processor for binding a removable module to an access terminal, comprising:
a first module for generating a random value at the removable module;
a second module for transmitting a command to the access terminal to perform an authentication operation, wherein the command is a standard message comprising a command qualifier that represents an authentication challenge;
a third module for providing the random value to the access terminal for performing the authentication operation;

a fourth module for receiving a response calculated by the access terminal based on the random value and a terminal key stored in a memory of the access terminal;

a fifth module for determining based on the response whether to authorize the access terminal to communicate with the removable module;

a sixth module for receiving a request from the access terminal to acquire a secret key stored on the removable module;

a seventh module for providing the secret key to the access terminal; and an eighth module for receiving a signal that deactivates the secret key such that the secret key is rendered inaccessible.

22. The at least one processor of claim 21, wherein the command is a Provide Local Information command.

23. A non-transitory computer-readable medium, having stored thereon computer-readable instructions for binding a removable module to an access terminal, comprising:

at least one instruction executable to cause a computer to generate a random value at the removable module;

at least one instruction executable to cause the computer to transmit a command to the access terminal to perform an authentication operation, wherein the command is a standard message comprising a command qualifier that represents an authentication challenge;

at least one instruction executable to cause the computer to provide the random value to the access terminal for performing the authentication operation;

at least one instruction executable to cause the computer to receive a response calculated by the access terminal based on the random value and a terminal key stored in a memory of the access terminal;

at least one instruction executable to cause the computer to determine based on the response whether to authorize the access terminal to communicate with the removable module;

at least one instruction executable to cause the computer to receive a request from the access terminal to acquire a secret key stored on the removable module;

at least one instruction executable to cause the computer to provide the secret key to the access terminal; and at least one instruction executable to cause the computer to receive a signal that deactivates the secret key such that the secret key is rendered inaccessible.

24. The computer program product of claim 23, wherein the command is a Provide Local Information command.

25. An apparatus, comprising:

means for generating a random value;

means for transmitting a command to an access terminal to perform an authentication operation, wherein the command is a standard message comprising a command qualifier that represents an authentication challenge;

means for providing the random value to the access terminal for performing the authentication operation;

means for receiving a response calculated by the access terminal based on the random value and a terminal key stored in a memory of the access terminal;

means for determining based on the response whether to authorize the access terminal to communicate with the removable module;

means for receiving a request from the access terminal to acquire a secret key stored on the removable module;

means for providing the secret key to the access terminal; and means for receiving a signal that deactivates the secret key such that the secret key is rendered inaccessible.

26. The apparatus of claim 25, wherein the command is a Provide Local Information command.

* * * * *